United States Patent [19]
Ishii et al.

[11] Patent Number: 5,327,995
[45] Date of Patent: Jul. 12, 1994

[54] METHOD OF LUBRICATION BETWEEN TWO SLIDING MEMBERS

[75] Inventors: Hideaki Ishii; Kazuhisa Kitamura; Hiroaki Takebayashi; Kouichi Yamauchi, all of Osaka, Japan

[73] Assignee: Koyo Seiko Co., Ltd., Osaka, Japan

[21] Appl. No.: 892,905

[22] Filed: Jun. 4, 1992

[30] Foreign Application Priority Data

Sep. 12, 1991 [JP] Japan ................ 3-232924

[51] Int. Cl.⁵ .............. F16C 17/00; F16C 21/00
[52] U.S. Cl. ..................... 184/5; 184/55.1; 184/100; 184/109; 384/463; 427/249
[58] Field of Search .......... 184/5, 100, 109, 55.1; 384/276, 322, 462, 907.1, 463; 427/248.1, 249

[56] References Cited

U.S. PATENT DOCUMENTS

| | | |
|---|---|---|
| 2,841,244 | 7/1958 | Sorem . |
| 2,994,408 | 8/1961 | Sorem et al. . |
| 3,720,499 | 3/1973 | Hirayama et al. ............ 427/249 |
| 4,316,921 | 2/1982 | Taylor et al. ............... 427/109 |
| 5,002,804 | 3/1991 | Kubon et al. ............... 427/249 |
| 5,139,876 | 8/1992 | Graham et al. ............. 428/411.1 |
| 5,163,757 | 11/1992 | Graham ..................... 384/463 |

FOREIGN PATENT DOCUMENTS 1-234165 9/1989 Japan .
3-20796 2/1991 Japan .

Primary Examiner—Thomas E. Denion
Attorney, Agent, or Firm—Mason, Fenwick & Lawrence

[57] ABSTRACT

In a method of lubrication between two sliding members at least one of which is made of a ceramic material, the improvement according to the present invention is characterized in that soot as produced by burning a hydrocarbon fuel is supplied between the two sliding members.

5 Claims, 9 Drawing Sheets

SCHEMATIC REPRESENTATION OF FRICTION AND WEAR TESTER

FRICTION COEFFICIENTS OF ALL SPECIMENS AS A FUNCTION OF TEMPERATURE

SPECIFIC WEAR RATES OF ALL SPECIMENS AS A FUNCTION OF TEMPERATURE

▨ Al₂O₃   ▧ Al₂O₃-TiC   ▦ SiC   ▨ Si₃N₄   ▩ Si₃N₄-TiN

ORIGINAL SURFACE

WEAR DEBRIS.

METHOD OF LUBRICATION BETWEEN TWO SLIDING MEMBERS

BACKGROUND OF THE INVENTION

The present invention relates to a method of lubrication between two sliding members at least one of which is made of a ceramic material and an apparatus for improving a lubrication between two sliding members at least one of which is made of a ceramic material.

Oils have conventionally been used in performing lubrication between two sliding members as in an automotive engine. A proposal has recently been made to use ceramic parts in the engine with a view to meeting various needs such as smaller cooling loss, lighter weight and better endurance under hostile operating conditions. Ceramic parts have such high heat resistance that they used not be cooled, thereby making it possible to reduce cooling loss.

On the other hand, ceramic parts become as hot as 300° C. and higher if they are not cooled. Obviously, currently used oils are not suitable for lubricating such hot members. Solid lubricants could be used in place of oils but they have the disadvantage of high cost and maintenance of solid lubricant film.

For example, when bearings such as a ball-and-roller bearing and a slide (plain) bearing are to be used in a hot atmosphere, oils or greases cannot be used as lubricants. Under the circumstances, solid lubricants are conventionally used as a component of the bearing such as a retainer or coatings of solid lubricants are applied to the sliding part of that bearing component. However, these conventional bearings lubricated by the methods described above have had the following problems. First, in the case of using a solid lubricant as a bearing component, the latter may break during use since the solid lubricant is generally a low-strength and brittle material, thus reducing the strength of the bearing component. In the second case of applying a coating of solid lubricant, the coated solid film may spall off from the substrate, leading to deterioration in the lubricating characteristics of the film. As a further problem which is common to both cases, the solid lubricant cannot be replenished even if it is exhausted.

SUMMARY OF THE INVENTION

An object, therefore, of the present invention is to provide a method of lubrication between two sliding members or an apparatus for improving a lubrication between two sliding members that both are free from the problems described above.

This object can be attained by a method of lubrication between two sliding members at least one of which is made of a ceramic material, characterized in that soot as produced by burning a hydrocarbon fuel is supplied between said two sliding members.

Further, this object can also be attained by an apparatus for improving a lubrication between two sliding members at least one of which is made of a ceramic material, characterized by comprising a soot supplying means for supplying a soot as produced by burning a hydrocarbon fuel between the two sliding members.

Said ceramic material is mainly composed of oxide ceramics; selected from a group essentially consisted of aluminium oxide, zirconium oxide, titanium oxide and magnesium oxide, or non-oxide ceramics; selected from a group essentially consisted of silicon carbide, silicon nitride, sialon, aluminium nitride and molybdenum carbide.

The present invention has been accomplished under the following circumstances. Soot has heretofore been considered as a material that damages the sliding members of an engine seriously enough to deteriorate its performance. However, as a result of various studies, the present inventors found that soot damaged sliding members because the soot as it mixed with an oil was deposited on the surfaces of the sliding members or invaded the space between the two sliding members, thereby preventing the supply of the oil between the sliding members. It was found that no such problem would ever occur in the sole presence of soot and the present invention has been accomplished on the basis of this finding.

The term "two sliding members" as used herein means two members that are in sliding or rotating engagement with each other, as exemplified by the cylinder and the piston of an engine, and by a race member and a rolling element of bearings which is movable relative to the race member. In the case of the engine cylinder and piston, the soot that is produced within the cylinder is preferably supplied to the rubbing surfaces of the two members.

Examples of the hydrocarbon fuel that can be used in the present invention include aliphatic hydrocarbons such as methane, ethane and propane, monocyclic hydrocarbons such as benzene, toluene and cumene, condensed cyclic hydrocarbons such as indene and naphthalene, biphenyl cyclic hydrocarbons, and spiro cyclic hydrocarbons.

When the soot produced by burning the hydrocarbon fuel is supplied between two sliding members, it forms a film on the surface of the sliding member made of a ceramic material, thereby preventing direct contact between the rubbing surfaces of the two sliding members. The soot has a large surface area and it comprises small (ca. 300–600 Å) particles (primary particles) that are bound together by van der Waal's forces into larger (secondary) particles of a few micrometers. However, the binding force is so weak that the secondary particles will readily disintegrate into the fine primary particles. The secondary particles are also characterized by a great force of molecular adhesion onto the surfaces of the sliding members, which facilitates the entrance of those particles between the rubbing surfaces of the two sliding members. As the two members slide against each other, the supplied secondary particles are disintegrated into the primary particles, thereby providing enhanced lubricity.

DETAILED DESCRIPTION OF THE PREFERRED EMBODIMENTS

The examples of the present invention are described below together with comparisons.

Test 1

Figure 1:
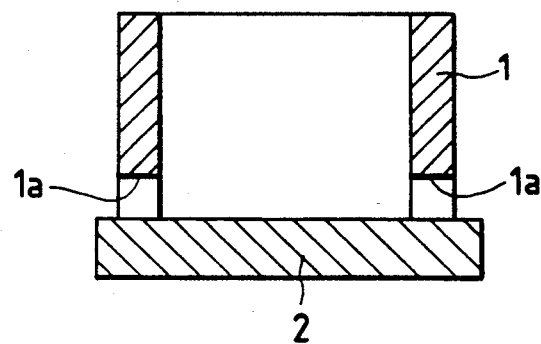
FIG. 1 is a longitudinal section of a friction test apparatus as it is in an upright position.

A ceramic material having MgO added to $\alpha\text{-Al}_2O_3$ was shaped into tubular members 1 and square plates 2 as shown in FIG. 1; each tubular member measured 26 mm in o.d., 20 mm in i.d. and 15 mm in length, and each square plate measured 30 mm long on one side and 5 mm thick. The alumina was sintered at 1630° C. and the sinters had a specific gravity of 3.9, a specific resistance of $10^{11}$, a bending strength of 39 kgf/mm$^2$, and a Vickers hardness (HV) of 1200. Two opposing slits 1a were formed across a diameter at one end of each tubular member 1. The tubular member 1 was placed on top of the square plate 2 in such a way that the end with slits 1a would face down. The soot obtained from the diffusion flame of benzene (i.e., benzene soot) was put into the tubular member 1, which was placed in an oven and heated at varying temperatures (RT-400° C.) as a friction test was conducted with the tubular member 1 and the square plate 2 being rotated relative to each other under the conditions specified below. During the rotation, the benzene soot entered between the rubbing surfaces of the tubular member 1 and the square plate 2 via the slits 1a.

| | |
|---|---|
| Load | 29.4 N |
| Speed | 0.1 m/s |
| Sliding distance | 1500 m |

At each ambient temperature, the coefficient of friction in a steady state was measured when the sliding distance reached 1000 m. At each ambient temperature, the amount of specific wear was determined after the sliding distance reached 1500 m. To determine the specific wear rate, the decrease in the volume of the tubular member 1 was calculated on the basis of the relationship between the change in the weight of the tubular member and its specific gravity and, thereafter, the calculated volume was divided by the load and the sliding distance {(volume/(load×distance)}.

As a comparison, a graphite powder (a known solid lubricant) was placed in the tubular member 1 instead of the benzene soot and friction coefficient measurements were conducted as described above. In a control test, the coefficient of friction and the specific wear rate determined with nothing placed in the tubular member 1.

Figure 2:
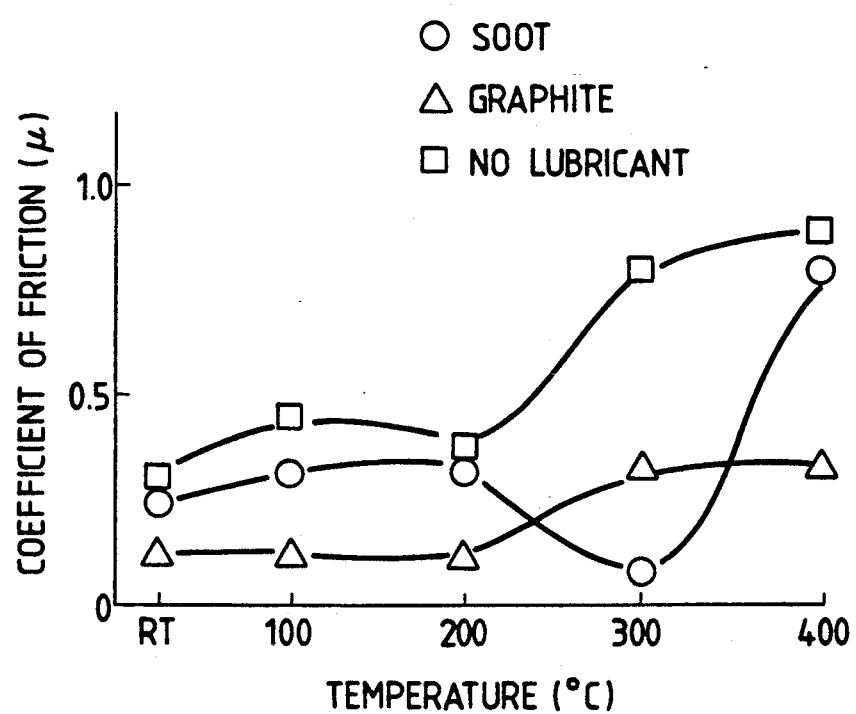
FIG. 2 is a graph showing the results of Test 1 in terms of the relationship between the ambient temperature for the friction test and the coefficient of friction.
Figure 3:
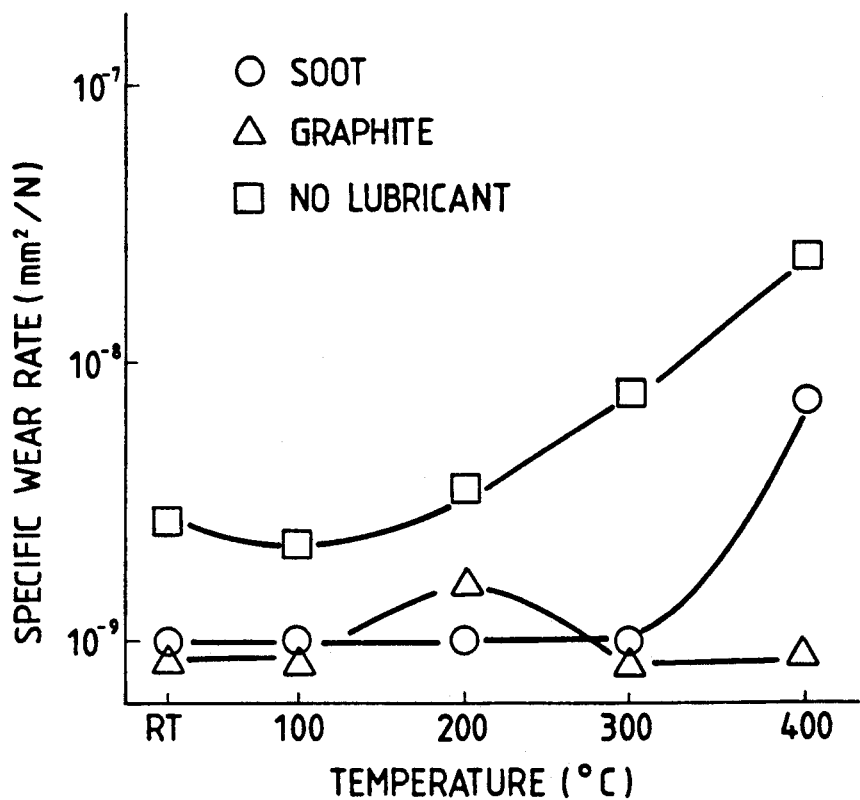
FIG. 3 is a graph showing the results of Test 1 in terms of the relationship between the ambient temperature for the friction test and the specific wear rate.

The test results are shown in FIGS. 2 and 3. As is clear from FIG. 2 which shows the relationship between the ambient temperature and the friction coefficient, the benzene soot provided lower coefficients of friction, thus imparting better lubricity than in the control case. It is also clear from FIG. 2 that the benzene soot provided even lower coefficients of friction than the graphite powder when the ambient temperature was within a certain range centering at 300° C.

As one can see from FIG. 3 which shows the relationship between the ambient temperature and the specific wear rate, the amount of specific wear that occurred in the case of using the benzene soot was small at each ambient temperature compared to the control case. In the range of RT to 300° C., the specific wear rate was smaller than or comparable to the values obtained by using the graphite powder.

Test 2

Figure 4:
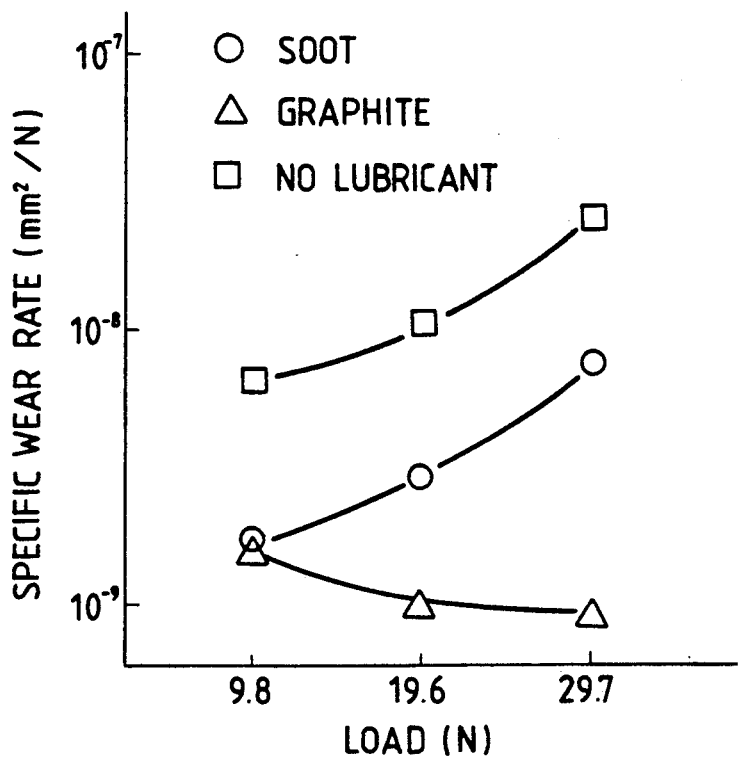
FIG. 4 is a graph showing the results of Test 2 in terms of the relationship between the load for the friction test and the specific wear rate.

For three different cases (i.e., the benzene soot was placed in the tubular member 1, the graphite powder was placed in it, and nothing was placed in it), a friction test was conducted by rotating the tubular member 1 and the square plate 2 relative to each other under the same conditions as in Test 1 except that the load was changed variously, and the specific wear rate was determined after the sliding distance reached 1500 m The test results are shown in FIG. 4, from which one can see the following: the specific wear rate that occurred when the benzene soot was used was smaller at each load than in the control case, and at smaller loads, the specific wear rate was comparable to the values obtained from the use of the graphite powder.

Test 3

Using four different samples of benzene soot (i.e., the first three were heat-treated in a nitrogen gas atmosphere at 700° C.×1 h, at 1100° C.×1 h and at 1500° C.×1 h, and the fourth sample was not given any heat treatment), a friction test was conducted at an ambient temperature of 300° C. with the tubular member 1 and the square plate 2 being rotated relative to each other under the same conditions as in Test 1, and the coefficient of friction was measured at each sliding distance.

Figure 5:
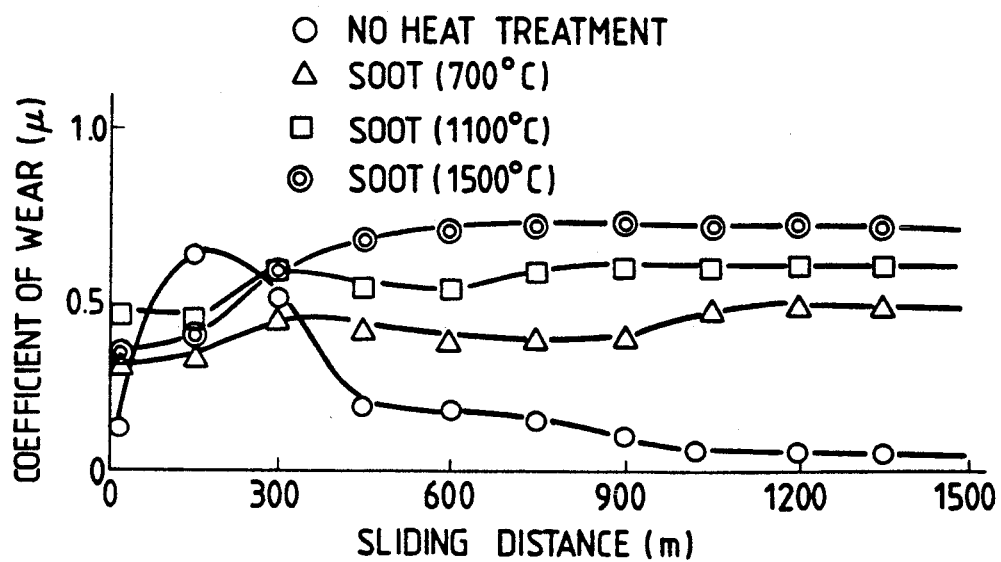
FIG. 5 is a graph showing the results of Test 3 in terms of the relationship between the sliding distance and the coefficient of friction.

The results are shown in FIG. 5, from which one can see that as the sliding distance increased, the coefficients of friction that were obtained from the untreated benzene soot were smaller and stabler than those obtained from the heat-treated samples. When one compares between the heat-treated samples, the coefficient of friction was smaller and stabler with the samples that were heat-treated at lower temperatures.

Test 4

Figure 6:
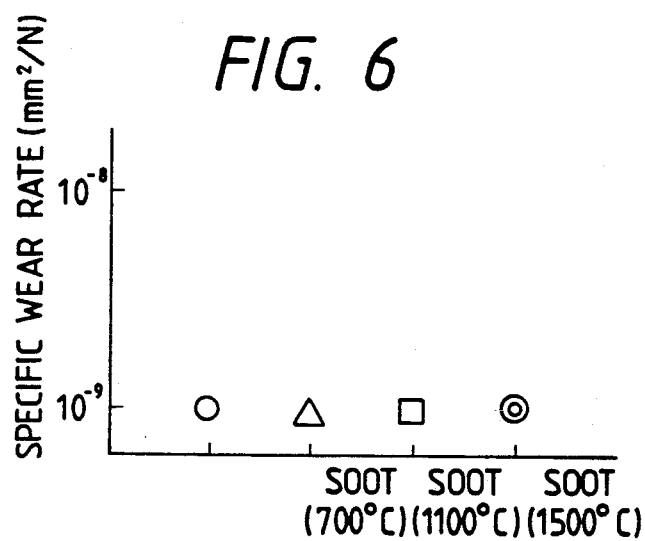
FIG. 6 is a graph showing the results of Test 4 by comparing the amounts of specific wear caused by the tested samples of soot.

Using four samples of benzene soot that were the same as those used in Test 3, a friction test was conducted at an ambient temperature of 300° C. by rotating the tubular member 1 and the square plate 2 relative to each other under the same conditions as in Test 1, and the amount of specific wear was determined after the sliding distance reached 1500 m. The results are shown in FIG. 6, from which one can see that the amount of specific wear was in no way different among the four samples of benzene soot.

Test 5

Using an apparatus of the same type as in Test 1, friction tests were conducted under the following three different conditions:
(a) After performing a first friction test at 300° C. using benzene soot, the latter was collected and placed into the tubular member 1 and a second friction test was conducted with the tubular member 1 and the square plate 2 being rotated relative to each other at the ambient temperature which was adjusted to RT;
(b) Benzene soot as placed in the tubular member 1 was heat-treated at 200° C. for 10 h and, thereafter, with the ambient temperature adjusted to 300° C., a friction test was conducted with the tubular member 1 and the square plate 2 being rotated relative to each other; and
(c) Benzene soot as placed in the tubular member 1 was heat-treated at 300° C. for 10 h and, thereafter, with the ambient temperature adjusted to 300° C., a friction test was conducted with the tubular member 1 and the square plate 2 being rotated relative to each other.

Figure 7:
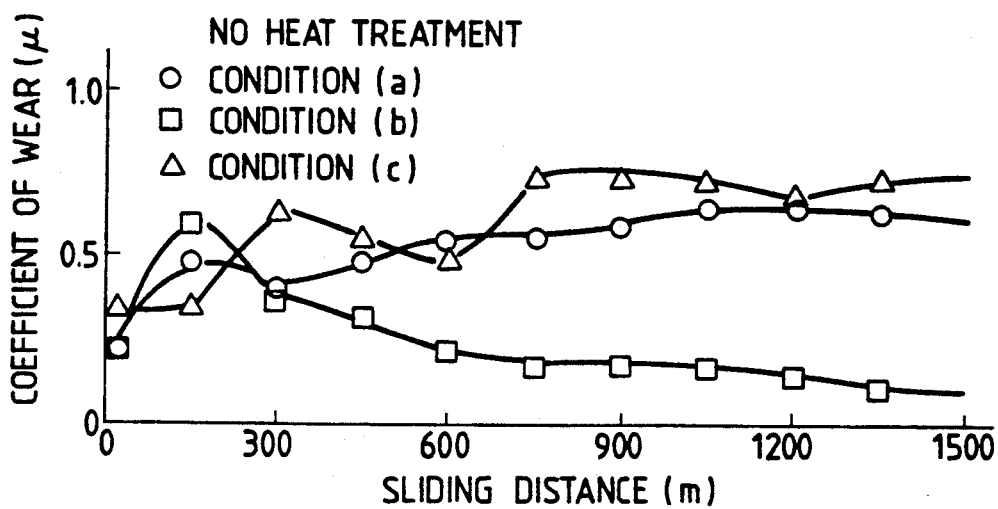
FIG. 7 is a graph showing the results of Test 5 in terms of the relationship between the sliding distance and the coefficient of friction.

The other test conditions, i.e., load, speed and sliding distance, were the same as in Test 1. The coefficient of friction was measured at each sliding distance. The test results are shown in FIG. 7, from which one can see that at longer sliding distances, the coefficients of friction as measured under conditions (b) were smaller and stabler than those measured under conditions (a) and (c). Comparing these results with those obtained in Test 1 regarding the benzene soot and with those obtained in Test 3 regarding the untreated benzene soot, one may safely presume as follows: first, the soot will experience a certain change upon heating up to 300° C., which change would lower the coefficient of friction; second, the change is irreversible and the soot will not revert to the initial state even if it is cooled after heating and, hence, it would be important to conduct a friction test with the ambient temperature being properly adjusted to a certain range centering on 300° C.

Test 6

Figure 8:
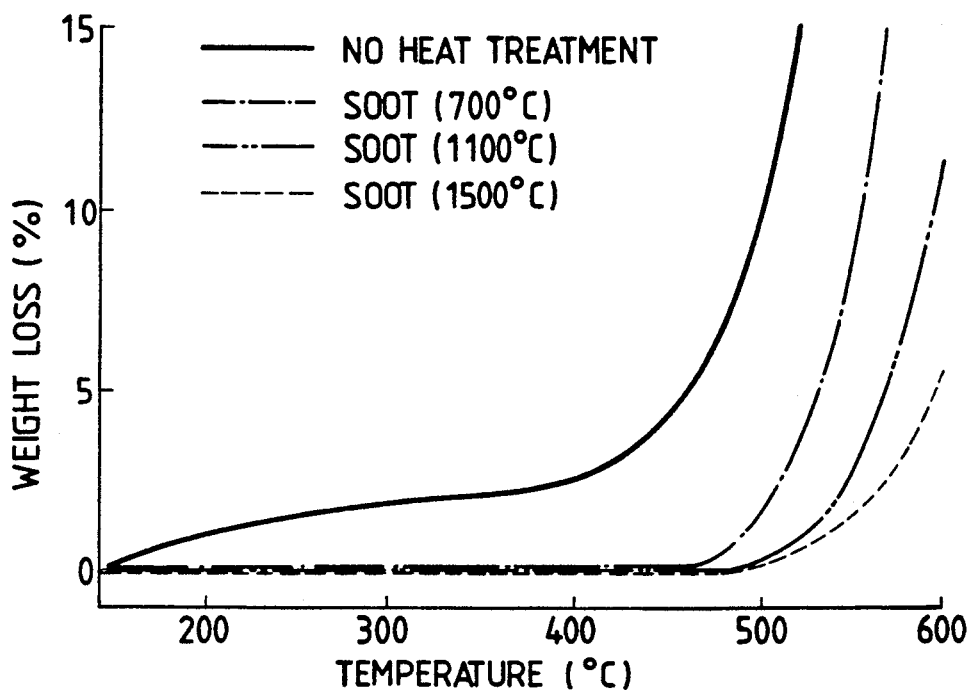
FIG. 8 is a graph showing the results of Test 6 in terms of the relationship between the heating temperature and the weight loss of benzene soot.

Four samples of benzene soot that were the same as those used in Test 3 were heated in air atmosphere at a rate of 10° C./min and the resulting weight loss (%) was measured. The results are shown in FIG. 8, from which one can see that the weight loss of the untreated benzene soot increased at a temperature exceeding 200° C. whereas the weight loss that occurred to the heat-treated samples increased at a temperature exceeding 450° C. This would be because the heat-treated soot samples already suffered weight loss during the heat treatment.

Test 7

Figure 9:
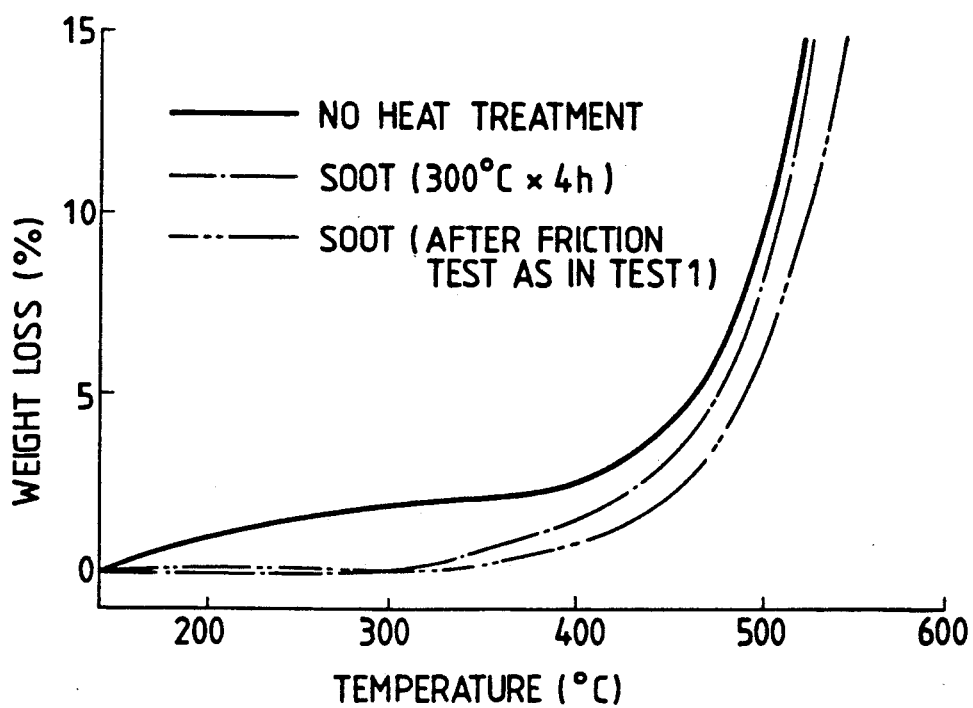
FIG. 9 is a graph showing the results of Test 7 in terms of the relationship between the heating temperature and the weight loss of benzene soot.

Three samples of benzene soot, i.e., one that was not given any treatment, one that was heated at 300° C. for 4 h, and one that was subjected to a friction test under the same conditions as in Test 1, were heated in air atmosphere at a rate of 10° C./min and the resulting weight loss (%) was measured. The results are shown in FIG. 9, from which one can see that the weight loss of the untreated benzene soot increased at a temperature exceeding 200° C. whereas the weight loss that occurred to the heat-treated samples increased at a temperature exceeding 300° C. This would be because the heat-treated soot samples already suffered weight loss during the heat treatment.

From the results of Tests 6 and 7, one can safely presume as follows: at 200° to 400° C. carbon, hydrogen, nitrogen and oxygen which are the components of the untreated benzene soot will partly leave the soot as they are released in the form of polycyclic aromatic hydrocarbons, making it lighter in weight; above 450° C., carbon which is the principal component of the soot will react with the oxygen in air and burn, making the soot lighter in weight; at the same time, the partial leaving of carbon, hydrogen, nitrogen and oxygen from the soot at 200° to 400° C. facilitates the disintegration of the composing particles of the soot, thereby contributing to an improvement in the lubrication of the rubbing surfaces of the two sliding members.

Test 8

Using untreated samples of benzene soot, a friction test was conducted at ambient temperatures of 100° C., 300° C. and 400° C. under the same conditions as in Test 1. After 30 min of the test, the ambient gas in the oven was sucked out with an aspirator and passed through a solution of $Ba(OH)_2$, whereupon $BaCO_3$ was precipitated by reaction according to the following scheme:

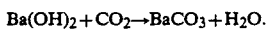

Subsequently, the precipitating $BaCO_3$ was converted to $BaSO_4$ by reaction according to the following scheme:

On the basis of the conversion, the amount of $CO_2$ in the oven was determined.

With the temperature in the oven adjusted to 100° C., 300° C. or 400° C. the gas in the oven was sucked out with an aspirator and the amount of $CO_2$ in the oven was determined by the same procedure as described above, except that no friction test was conducted. The amount of $CO_2$ for the case where no friction test was conducted was subtracted from the amount of $CO_2$ for the case where the friction test was conducted, thereby determining the amount of $CO_2$ that was evolved in the oven as a result of the friction test; on the basis of the thus determined amount of $CO_2$, the reduction in the weight of the soot due to combustion was calculated. The results are shown in the following table.

| Ambient temp. (°C.) | Amount of CO$_2$ (ml) | Soot weight loss (mg) |
|---|---|---|
| 100 | 0.04 | 0.02 |
| 300 | 0.52 | 0.62 |
| 400 | 1.19 | 1.43 |

As is clear from this table, the higher the temperature at which the friction test was performed, the greater the reduction in the weight of the soot in the oven and the more vigorous the soot oxidizing reaction that occurred at the rubbing surfaces of the tubular member 1 and the square plate 2, making the soot less prone to be deposited on the rubbing surfaces.

Test 9

Figure 10:
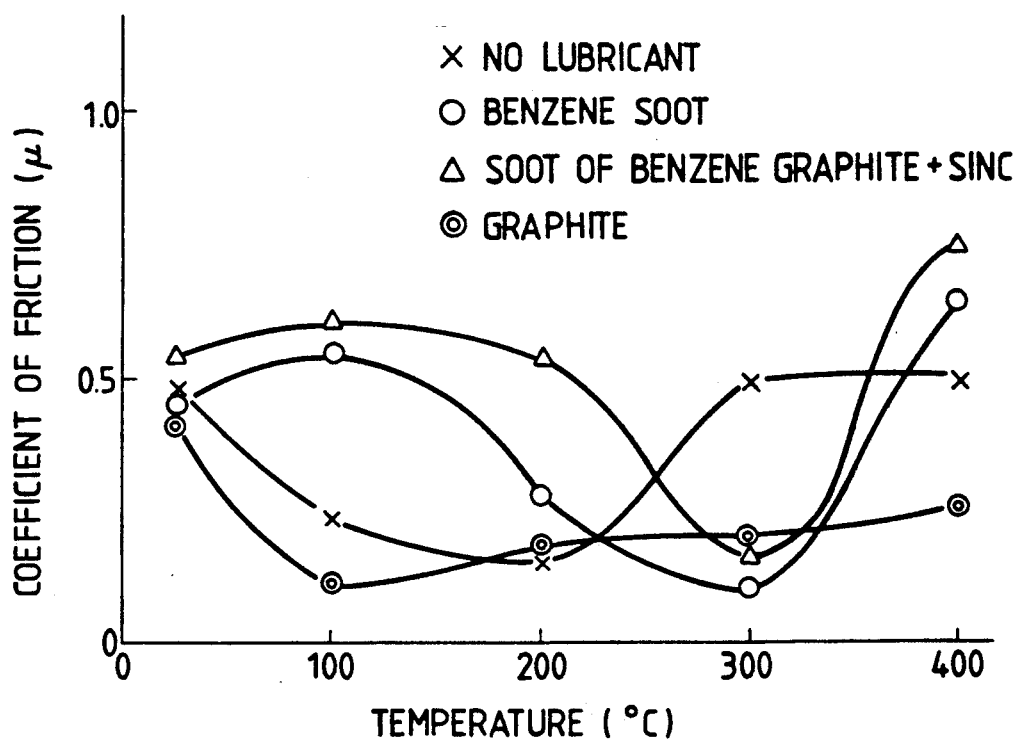
FIG. 10 is a graph showing the results of Test 9 in terms of the relationship between the ambient temperature for the friction test and the coefficient of friction.
Figure 11:
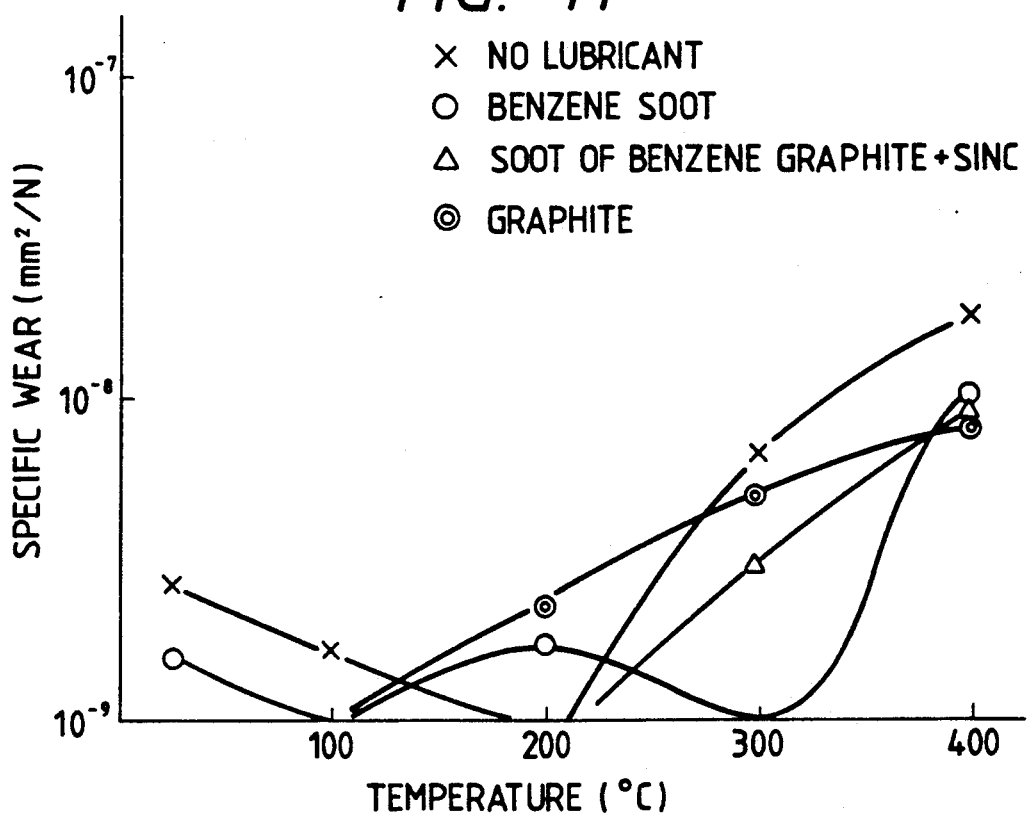
FIG. 11 is a graph showing the results of Test 9 in terms of the relationship between the ambient temperature for the friction test and the specific wear rate.

A friction test was conducted under the same conditions as in Test 1 except that the tubular member 1 and the square plate 2 were shaped from SiC and that two different types of benzene soot were used (i.e., the soot of benzene alone and the soot obtained from the diffusion flame of a fuel having zinc added to benzene. At each ambient temperature, the coefficient of friction in a steady state was measured when the sliding distance reached 1000 m. At each ambient temperature, the amount of specific wear was determined after the sliding distance reached 1500 m. The test results are shown in FIGS. 10 and 11.

Test 10

Figure 12:
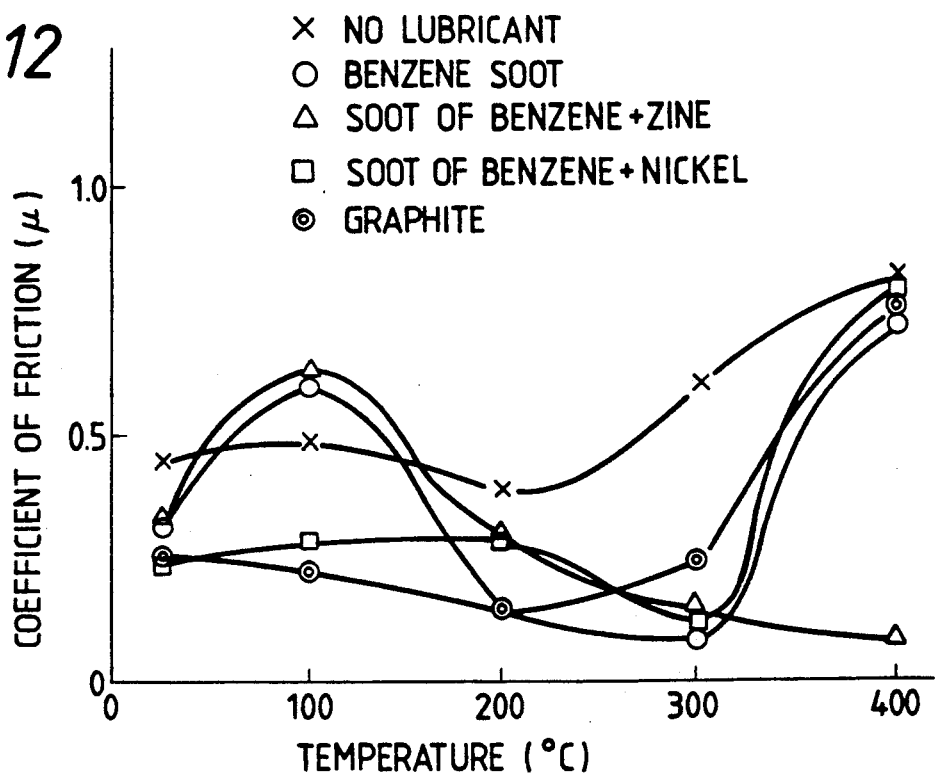
FIG. 12 is a graph showing the results of Test 10 in terms of the relationship between the ambient temperature for the friction test and the coefficient of friction.
Figure 13:
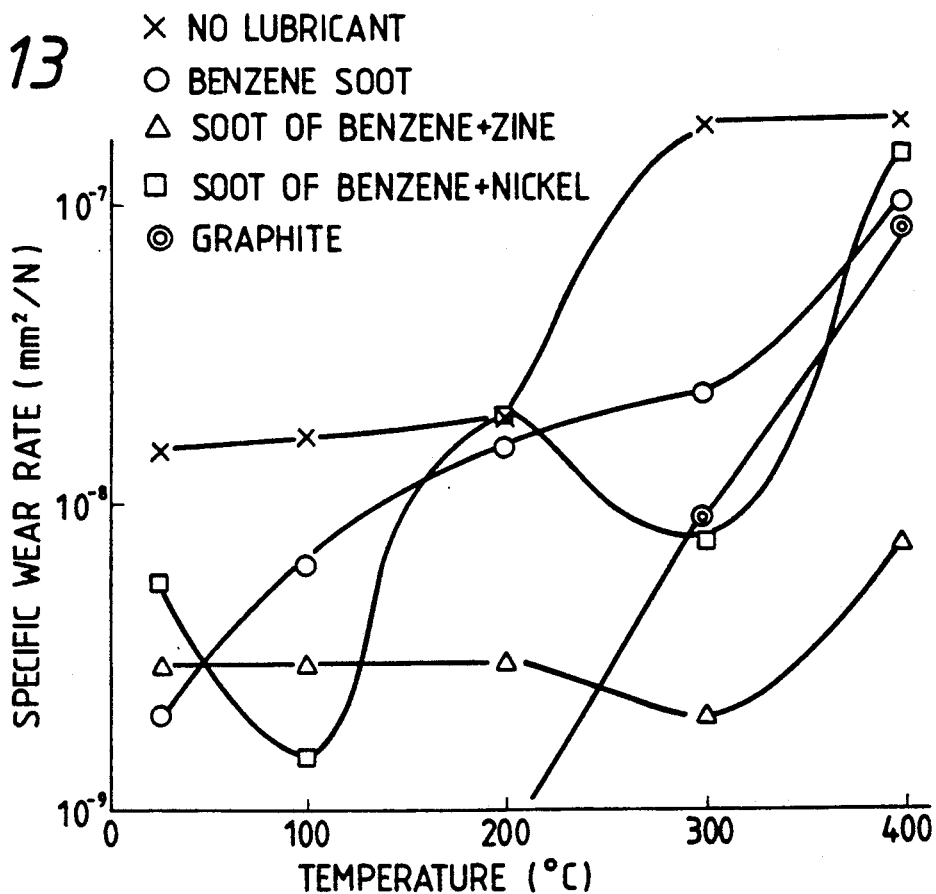
FIG. 13 is a graph showing the results of Test 10 in terms of the relationship between the ambient temperature for the friction test and the specific wear rate.

A friction test was conducted under the same conditions as in Test 1 except that the tubular member 1 and the square plate 2 were shaped from Si$_3$N$_4$ and that three different types of benzene soot were used (i.e., the soot of benzene alone, the soot obtained from the diffusion flame of a fuel having zinc added to benzene, and the soot obtained from the diffusion flame of a fuel having nickel added to benzene). At each ambient temperature, the coefficient of friction in a steady state was measured when the sliding distance reached 1000 m. At each ambient temperature, the amount of specific wear was determined after the sliding distance reached 1500 m. The test results are shown in FIGS. 12 and 13.

The results of Tests 9 and 10 show that even if the sliding members are made of ceramic materials other than alumina, the following characteristic advantages of the present invention are attained if the ambient temperature is within a certain range centering at 300° C.: the use of soot provided lower coefficients of friction than in the case where on lubricant was used or graphite was used as a solid lubricant; at the same time, the amount of specific wear was smaller except in the case of using benzene soot with Si$_3$N$_4$. It was therefore clear that better lubricity was imparted by the method of the present invention.

Test 11

Figure 14:
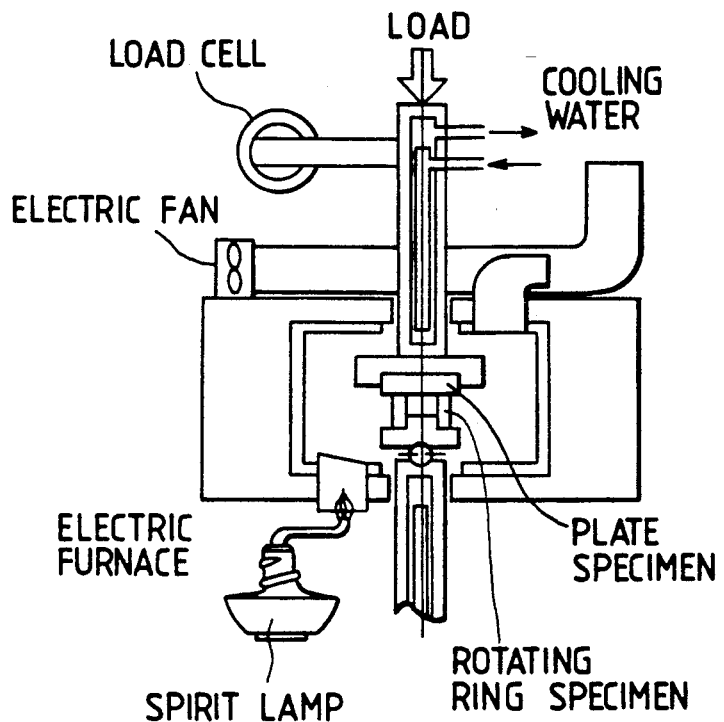
FIG. 14 is a shematic representation of wear tester of Test 11.

FIG. 14 shows schematic representation of wear tester and running conditions. As shown in this figure, ring-on-disk type wear tester is used in this tests. Benzene is used as the fuel and burn by this spirit lamp. The combustion gas including the soot enter to the electric furnace, and is introduced between the sliding surfaces through two slits situated on the ring specimen. The friction force is continuously measured by a load cell, and recorded during each test.

Wear tests are conducted at temperatures ranging from room temperature to 400° C. Each sliding test was conducted between a same type of ceramic specimen for collar and plate. Other testing conditions are like following table.

| Sliding Speed | 0.1 m/s |
|---|---|
| Sliding distance | 1350 m |
| Load | 53.9 N |
| Temperature | Room temperature ~400° C. |

The ceramic materials chosen for this investigation were five types of commercially available ceramics. Typical mechanical properties of these ceramics are illustrated in following Table. All the ceramics were manufactured a hot isostatic pressing technique to insure pore-free, homogeneous microstructure, and consequently, uniform physical and mechanical properties. The maximum surface roughness of each ceramic surface was taken to be R$_{max}$=0.5 μm.

| | Specific Gravity | Vickers Hardness (GPa) | Flexural Strength (MPa) | Young's Modulus (GPa) |
|---|---|---|---|---|
| Al$_2$O$_3$ | 3.90 | 11.8 | 382 | 186 |
| Al$_2$O$_3$—TiC | 4.24 | 18.7 | 757 | 398 |
| SiC | 3.10 | 30.4 | 813 | 392 |
| Si$_3$N$_4$ | 3.20 | 14.7 | 735 | 304 |
| Si$_3$N$_4$—TiN | 3.80 | 12.7 | 833 | — |

The specimens are cleaned before and after the tests with acetone in an ultrasonic cleaner, and weighed with an analytical high accuracy balance to calculate the specific wear rate.

Figure 15:
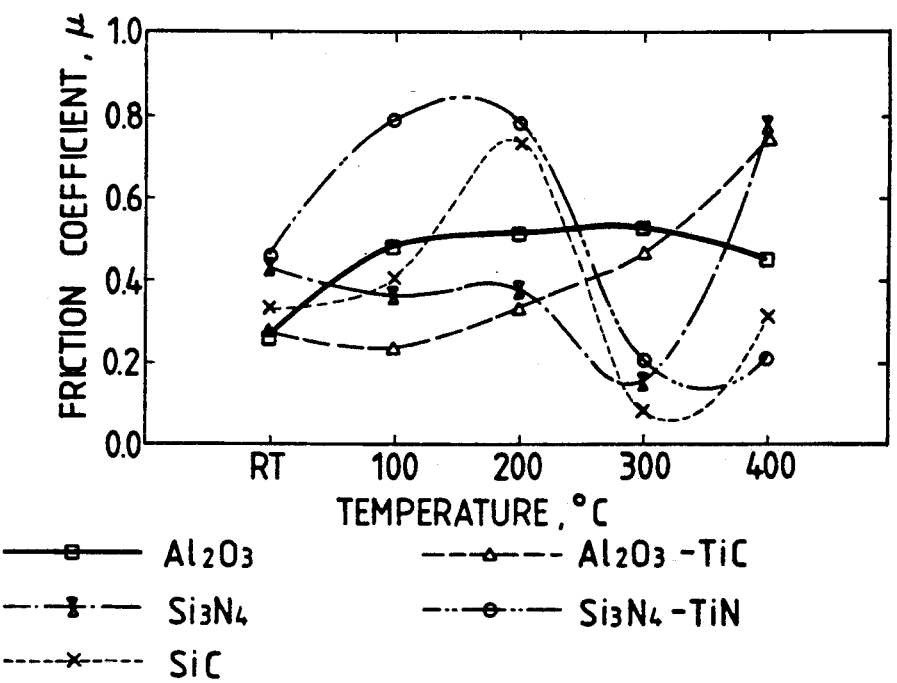
FIG. 15 is a graph showing the results of Test 11 in terms of the relationship between the ambient temperature for the friction test and the coefficient of friction.

FIG. 15 shows the friction coefficients of all ceramic couples at the final stages of the wear tests. As shown in this figure, non-oxide ceramics, SiC, Si$_3$N$_4$ and Si$_3$N$_4$-TiN couples, indicate a low friction coefficient of about 0.07 to 0.2 at 300° C.

At 400° C., Sic and Si$_3$N$_4$-Tin still indicate a relatively low friction coefficient, but only Si$_3$N$_4$ indicates a high friction coefficient like that of unlubricated condition.

In the case of oxide ceramics, however, the situation is somewhat different from those of the non-oxide ceramics. The friction coefficient tends to increase with temperature.

Figure 16:
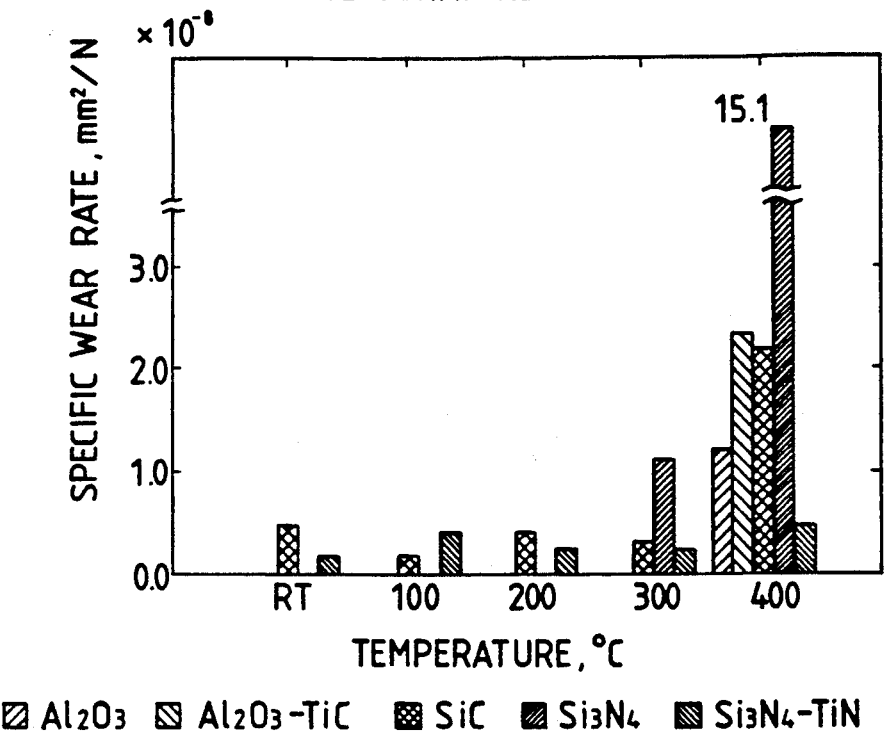
FIG. 16 is a graph showing the results of Test 11 in terms of the relationship between the ambient temperature for the friction test and the specific wear rate.

The specific wear rates of all ceramic specimens are shown in FIG. 16. No significant change can be seen in any ceramic couple below 300° C., but in the case of Si$_3$N$_4$ couples, wear rate increases rapidly at 400° C. It is said that wear rate is due to the balance between tribochemical reaction and mechanical wear rates. In this case, it is also believed due to the adhesiveness and stability of the soot on the ceramic surfaces. The decrease of friction coefficient at temperatures above 200° C. shown in FIG. 6 may be explained by the hydrocarbons disconnected from soot on the ceramic sliding surface. The thermogravitic analysis of soot showed that the weight loss curve exhibits a slight increase at about 200° C., making a small shoulder, and a sharp increase in the weight loss is seen above 450° C. due to rapid oxidation.

The results given by thermogravitic analysis suggest that the decrease in the friction coefficient at about 300° C. relates to the partial decomposition of particulate at around this temperature.

Figure 17A:
FIG. 17 is a graph showing the FT-IR absorbance of SiC at 300° C.
Figure 17B:
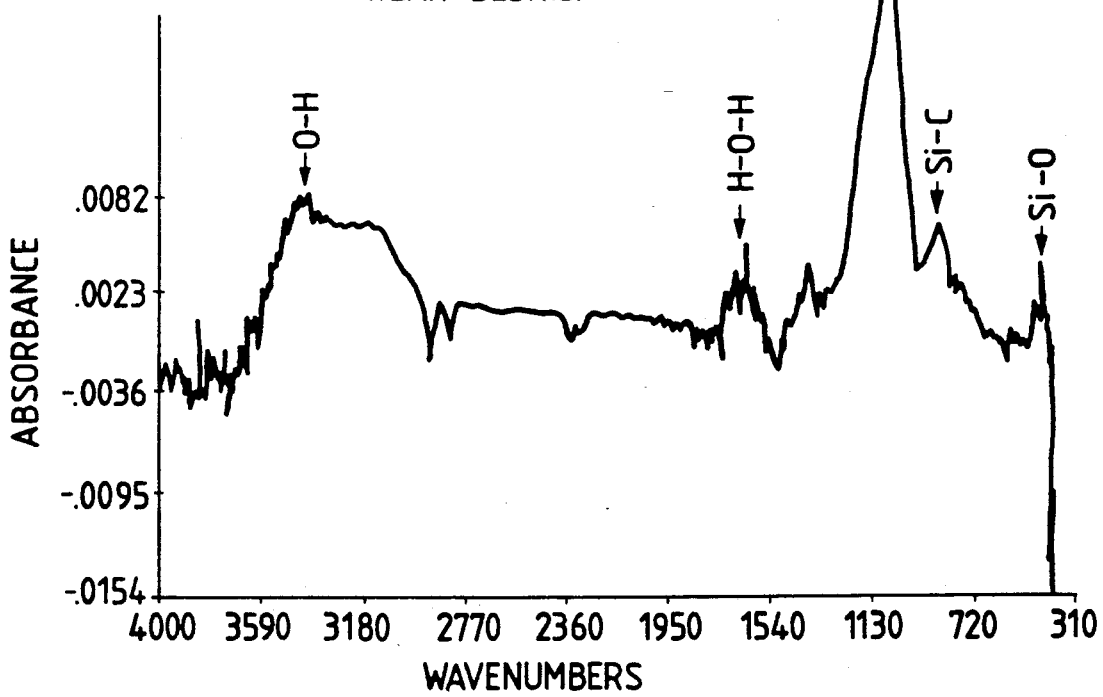

The oxide morphology on the ceramic surfaces was investigated by examining the worn surfaces at various temperatures. FIG. 17 illustrates the FT-IR data obtained from the wear debris of the SiC/SiC couple at 300° C. It is seen that the spectra observable at 1100 $cm^{-1}$ and 3500 $cm^{-1}$ suggest the presence of $SiO_2$ and $SiO_2.H_2O$, respectively.

According to the method of the present invention, lubricity of a comparable level to that of solid lubricants can be attained and yet the operating cost is reasonably low.

An embodiment utilizing the present invention is described below with reference to the accompanying drawing.

Figure 18:
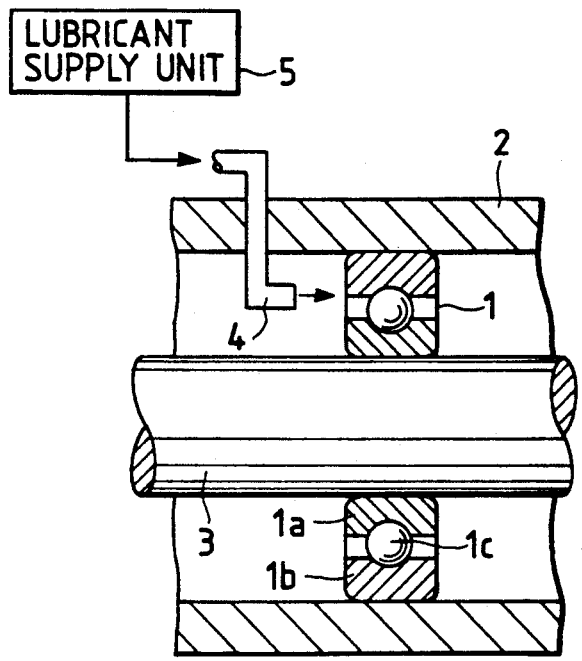
FIG. 18 is a longitudinal section of a ball-and-roller bearing together with the associated lubricator in which the present invention is utilized.

FIG. 18 shows an example of the lubrication mechanism of the present invention as it is applied to a ball bearing 1 that is to be used in a hot atmosphere. As shown, the bearing 1 consists of an inner race 1a, an outer race 1b, and a plurality of balls 1c held between the two races. Each of these components is formed of a heat-resistant material such as ceramics, SKH4 (JIS) and SUS 440C (JIS). The outer race 1b is supported in a housing 2 and a shaft 3 it passed through the inner race 1a. The interior of the housing 2 is maintained in a predetermined hot atmosphere.

Provided within the housing 2 is a lubricant supply nozzle 4 through which to eject a lubricant toward the bearing 1. The nozzle 4 is connected to a lubricant supply unit 5 in such a way that a mixture of air and the lubricant which is a benzene solution can be ejected either continuously or intermittently through the nozzle 4 toward the bearing 1 as the need arises.

When the benzene solution is ejected through the nozzle 4 toward the bearing 1 in a hot atmosphere, benzene burns at the ambient temperature to produce soot (carbide), which is deposited on the respective parts of the bearing 1. The soot as the product of benzene combustion has such high lubricating characteristics that it will serve as a solid lubricant to lubricate the bearing 1 effectively. One may simple eject the benzene solution through the nozzle 4 in combination with the lubricant supply unit 5, by so doing, soot which is the solid lubricant can be readily formed and supplied to the bearing 1 without causing any interruption of the supply of fresh solid lubricant.

Soot as the product of benzene combustion has high lubricating characteristics and can be effectively used as a solid lubricant, has been already verified by the present invention.

The lubricant that can be used in this example of the present invention is by no means limited to a benzene solution and it may be of any type that burns in a hot atmosphere to produce a carbide.

The present invention is applicable not only to a ball-and-roller bearing but also to a slide bearing.

As described on the foregoing pages, the lubricant used in the bearing lubrication mechanism utilizing the present invention burns in a hot atmosphere to produce a carbide which serves as a solid lubricant that has high enough lubricating characteristics to effectively lubricate the bearing. One may simply eject the lubricant in solution from the lubricant supply nozzle, whereby the carbide as a solid lubricant can be readily formed and supplied to the bearing without causing any interruption of the supply of fresh solid lubricant.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A method of lubricating two sliding members, at least one of which is made of a ceramic material, comprising the following steps which occur at an ambient temperature between 200° and 400° degrees centigrade:
   burning a hydrocarbon fuel to form soot comprised of a mixture of particulate carbon and organic and inorganic components;
   and supplying said soot between said two sliding members.

2. A method according to claim 1, wherein said hydrocarbon fuel is selected from the group consisting essentially of aliphatic hydrocarbons, monocyclic hydrocarbons, condensed cyclic hydrocarbons, biphenyl cyclic hydrocarbons and spiro cyclic hydrocarbons.

3. A method according to claim 1, wherein said ceramic material is comprised of oxide ceramics, selected from a group consisting essentially of aluminium oxide, zirconium oxide, titanium oxide and magnesium oxide.

4. A method according to claim 1, wherein said ceramic material is comprised of non-oxide ceramics, selected from a group consisting essentially of silicon carbide, silicon nitride, sialon, aluminium nitride and molybdenum carbide.

5. A mechanism for lubricating a bearing, said bearing being formed of a heat-resistant material and positioned in a hot atmosphere in a temperature range between 200° through 400° degrees centigrade, said mechanism including a lubricant supply nozzle through which a lubricant, composed of a solution that burns in said hot atmosphere to produce a soot comprised of a mixture of particulate carbon and organic and inorganic components, is ejected toward the bearing.

* * * * *